July 23, 1963    H. A. DINTER, JR    3,098,306
GYROCOMPASS
Filed June 29, 1961
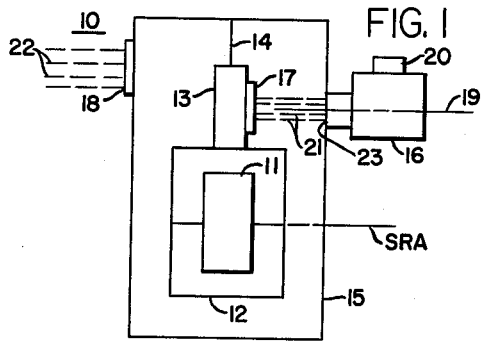
FIG. 1
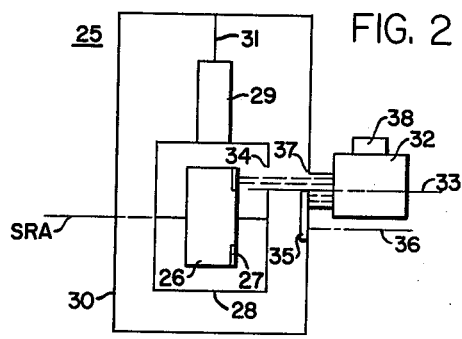
FIG. 2
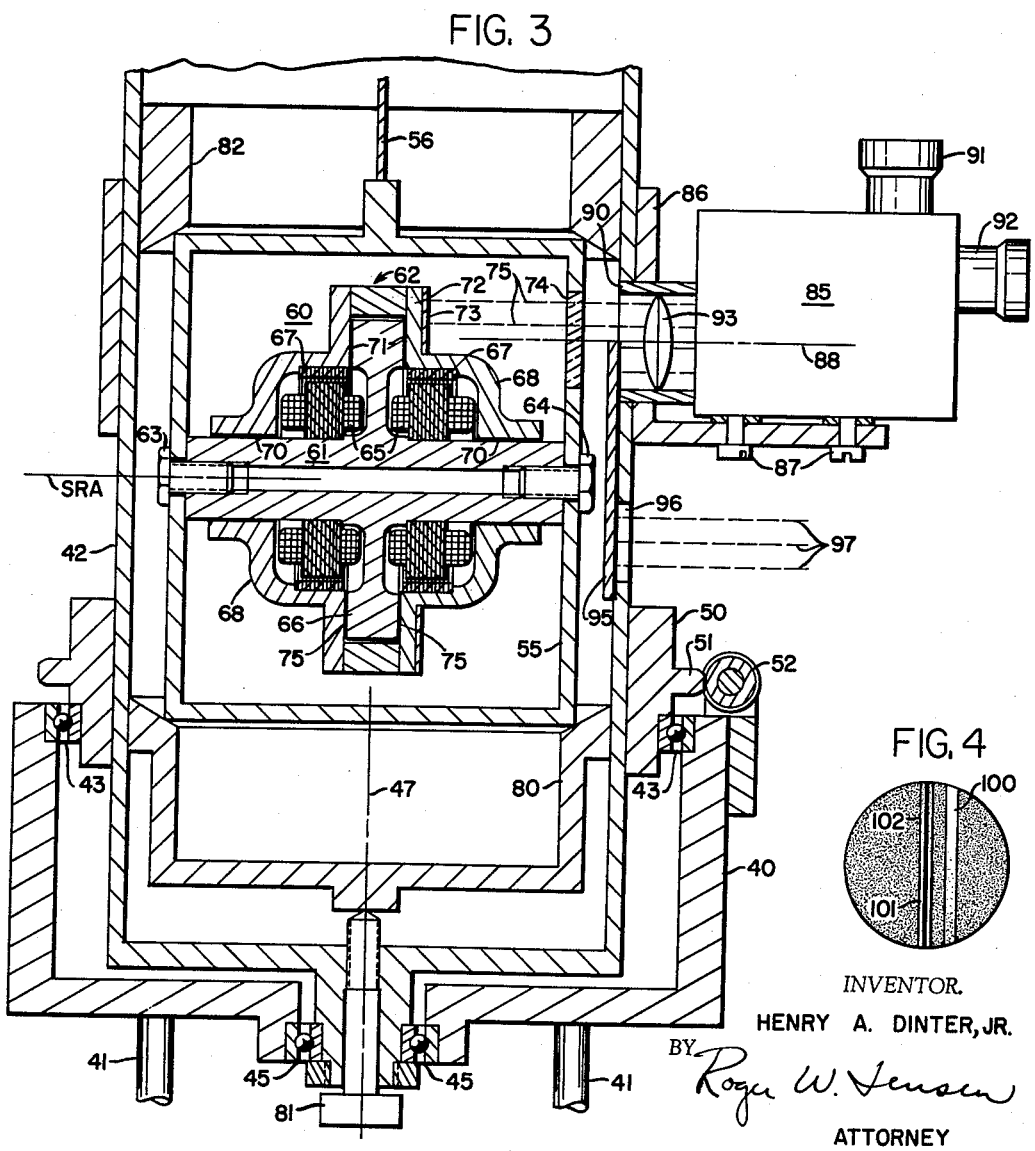
FIG. 3
FIG. 4
INVENTOR.
HENRY A. DINTER, JR.
BY Roger W. Jensen
ATTORNEY

United States Patent Office 3,098,306
Patented July 23, 1963

3,098,306
GYROCOMPASS
Henry A. Dinter, Jr., Minneapolis, Minn., assignor to Minneapolis-Honeywell Regulator Company, Minneapolis, Minn., a corporation of Delaware
Filed June 29, 1961, Ser. No. 120,559
8 Claims. (Cl. 33—226)

This invention relates to pendulous gyroscopic compasses commonly referred to by those skilled in the art as pendulous gyro northfinders and more particularly to optical readout systems therefor.

A pendulous gyroscopic northfinder consists basically of a gyro spin motor rotatably mounted in a gimbal means for rotation about a spin reference axis (SRA), the SRA being approximately parallel to the surface of the earth. The gimbal means is pendulously suspended within a housing means by means of a suspension wire. The axis of the suspension wire is approximately perpendicular to the SRA and the gimbal means is allowed to rotate about the axis of the suspension wire. When the spin motor is energized and rotates about the SRA, the SRA in turn oscillates about the true north direction. Actually the spin motor is rigidly mounted on the gimbal means, and the gimbal means and spin motor (and consequently the SRA) oscillate about the axis of the suspension wire. Therefore, to determine the true north direction it is necessary to provide a readout system to determine the direction of the SRA.

Prior art readout schemes for obtaining the direction of the SRA comprise a mirror attached to a gimbal element so that it is substantially perpendicular to the SRA. An autocollimator means is attached to the housing means. The housing means is adapted to rotate relative to its base means so that the autocollimator means may follow the oscillations of the SRA. That is to say, the optical axis of the autocollimator means is maintained perpendicular to the surface of the gimbal mirror. A readout mirror is also attached to the housing means so that it follows the oscillations of the SRA as the optical axis of the autocollimator means is maintained perpendicular to the surface of the mirror mounted on the oscillating gimbal means.

These prior art optical readout schemes for obtaining the direction of the SRA and consequently the true north direction, are not accurate enough for the present day requirements for determining the launch orientations of mobile missiles. The true north direction must be determined within five seconds of arc. This is not practical with the prior art optical readout systems due to the inherent instabilities of the systems.

The reasons for the instabilities are that the angle between the SRA and a line perpendicular to the surface of the gimbal mirror, such as the optical axis of the autocollimator means is unknown. The angle between the optical axis of the autocollimator means and readout mirror is also unknown. Consequently, the northfinder must be calibrated. A northfinding run must be made and the angle between the readout mirror and true north must then be measured and recorded as a calibration for the instrument. Moreover, this calibration, once made, will vary due to instabilities in these angles and instabilities in the optical axis of the autocollimator means. The information of the direction of the SRA is, in effect, stored in the autocollimator means. However, due to the instability of the optical axis of the autocollimator means, any change thereof will cause a loss of calibration of the instrument.

The applicant's invention eliminates these errors of the prior art devices and provides an optical readout means capable of determining the direction of the SRA within the required accuracy. The applicant's invention provides a primary (uncalculated) indication of the direction of the SRA. This is accomplished by utilizing a spin motor which has a reflecting surface substantially perpendicular to the SRA. An autocollimator means is provided which projects an image along the optical axis thereof. Means are also provided for maintaining the optical axis perpendicular to the reflecting surface of the spin motor during the oscillations thereof so as to reflect a first image back to the autocollimator means. Consequently, an indication of the direction of the SRA is obtained directly from the reflecting surface of the spin motor. This arrangement eliminates the unknown angle between the gimbal mirror and the SRA and the variations therein. Further, the applicant provides a readout mirror which is positioned parallel to surface 73 and/or perpendicular to the optical axis so that it reflects a second image back to the autocollimator means, it being understood that the readout mirror and the reflecting surface each individually reflect the projected image. The surface of the readout mirror is maintained parallel to the reflecting surface 73 of the spin motor by aligning the two reflected images in the eyepiece of the autocollimator means. This arrangement eliminates the unknown angle between the readout mirror and the optical axis of the autocollimator means and eliminates the uncertainties inherent therewith. Consequently, the autocollimator means is utilized strictly as a transfer means, that is to say, the information is transferred from the reflecting surface of the spin motor directly to the readout mirror. In this arrangement, the optical axis of the autocollimator means need not be stable and any errors originating from this instability are thereby eliminated. In addition, by utilizing the applicant's unique optical readout system, it is not necessary to calibrate the northfinder and all of the errors associated with the calibrating methods are eliminated.

It is therefore an object of this invention to provide an improved control apparatus.

It is a further object of this invention to provide an improved pendulous gyroscopic northfinding device.

These and other objects of the invention will become apparent from a study of the accompanying specification and claims in conjunction with the drawing in which:

FIGURE 1 is a schematic representation of a prior art pendulous gyroscopic northfinder device;

FIGURE 2 is a schematic representation of the applicant's unique pendulous gyroscopic northfinder device;

FIGURE 3 is a detailed cross-sectional view of the applicant's unique optical follow-up system; and FIGURE 4 is a representation of a view presented in the eyepiece of the autocollimator means.

Referring now to FIGURE 1, reference numeral 10 generally depicts a schematic representation of a prior art pendulous gyroscopic northfinder device. The rotor of the gyro spin motor is identified by the reference numeral 11 and is rotatably mounted by suitable means within a gimbal element 12. The spin reference axis (SRA) of rotor 11 is positioned horizontal (parallel to the surface of the earth). The gimbal element 12 contains an extension portion 13 rigidly attached thereto. The gimbal element 12 and extension element 13 are pendulously suspended by means of a suspension wire 14 within a housing element 15. The longitudinal axis of the suspension wire is perpendicular to the SRA. An autocollimator means 16 is rigidly attached to the housing element 15 adjacent to an aperture 23 in the housing element. An optical axis of the autocollimator means is identified by reference numeral 19. The autocollimator means 16 is attached to the housing element so that the optical axis 19 is positioned perpendicular to the axis of suspension wire 14. A mirror 17 is rigidly attached to the gimbal extension 13 and positioned so that its surface is generally perpendicular to the SRA. As the SRA oscillates about the true north direction the housing element 15 is rotated in phase with the SRA so that the optical axis 19 is maintained perpendicular to the surface of mirror 17. It is possible to determine when the optical axis 19 is perpendicular to the surface of mirror 17 by aligning a crosshair in the eyepiece 20 of autocollimator means 16 with an image projected by the autocollimator means through aperture 23 to mirror 17 and reflected back to eyepiece 20 along the line of sight represented by lines 21. A readout mirror 18 is attached to the housing element 15 with its surface generally perpendicular to the optical axis 19. Therefore a line perpendicular to the surface of readout mirror 18, such as lines 22, is an indication of the direction of the SRA and hence an indication of the true north direction.

Due to the structure of this northfinder device, it is evident that an unknown angle exists between the SRA of spin motor 11 and a line perpendicular to the surface of gimbal mirror 17 (such as optical axis 19). That is to say, it is impossible to attach mirror 17 to gimbal extension 13 so that its surface is absolutely perpendicular to the SRA. Also, there is an unknown angle between a line perpendicular to the surface of gimbal mirror 17 (such as optical axis 19) and a line perpendicular to the surface of the readout mirror 18 (such as lines 22). Consequently, this prior art northfinder must be calibrated; that is, a northfinding run must be made and the angle between the readout mirror and the true north must be measured and recorded as a calibration of the instrument. Moreover, once this calibration is made it will vary due to the uncertainty in these angles and the instability of optical axis 19.

With reference to FIGURE 2, the reference numeral 25 generally depicts a schematic representation of the applicant's unique pendulous gyroscopic northfinder device. The rotor of an air-bearing spin motor is identified by the reference numeral 26 and is mounted within a gimbal element 28 for rotation about a spin reference axis (SRA). The SRA is positioned approximately horizontal (parallel to the surface of the earth). The rotor 26 has a reflecting surface 27 thereon which is substantially perpendicular to the SRA. The construction of the air-bearing spin motor will be more fully discussed hereinafter. Gimbal element 28 has an extension portion 29 rigidly attached thereto. Gimbal element 28 and extension element 29 are pendulously suspended within a housing means 30 by means of a suspension wire 31. The longitudinal axis of the suspension wire 31 is perpendicular to the SRA. An autocollimator means 32 is rigidly attached to the housing means 30 so that an optical axis 33 of the autocollimator means 32 is positioned perpendicular to the axis of suspension wire 31. The autocollimator is positioned to that the optical axis 33 is approximately coaxial with an aperture 37 in housing element 30. A window 34 is provided in gimbal element 28 to allow the passage of light from the autocollimator means 32 to the reflecting surface 27 when optical axis 33 is approximately coaxial with the axis of window 34. Optical axis 33 is maintained approximately coaxial with the axis of window 34 and precisely perpendicular to the reflecting surface 27 during the oscillation of the SRA about the true north direction (and about the axis of wire 31) by suitable means hereinafter described.

A readout means or readout mirror, or readout element 35, having a reflecting area thereof is rigidly attached to the housing means 30. The area is positioned so that it is perpendicular to the optical axis 33 and so that it intersects a portion of the light passing from the atuocollimator means 32 to the reflecting surface 27 of spin motor rotor 26. Readout means 35 is oriented so that the reflecting area reflects outwardly from rotor 26 as viewed in FIGURE 2. An image is projected by autocollimator means 32 (e.g. a straight rectangular beam of light) along optical axis 33. A first image is reflected by surface 27 back to the eyepiece 38 of autocollimator means 32. A second image is reflected by the reflecting area of readout means 35 back to the eyepiece 38 of autocollimator means 32, it being understood that the surface 27 and the readout means 35 individually reflect the image projected by the autocollimator means 32. By aligning the first and second reflected images in the eyepiece 38, the reflecting area of readout means 35 is maintained parallel with surface 27 and therefore perpendicular to the SRA. The mechanics of aligning the image will be more fully discussed hereinafter. Therefore, a line perpendicular to the reflecting area of readout means 35, such as line 36, is parallel to and aligned with the SRA of rotor 26 and thus gives a primary (uncalibrated) indication of the direction of the SRA and hence an indication of the direction of true north.

It should be noted that the applicant's unique northfinder device eliminates the unknown angles of the prior art devices and the need for calibration of the device, hence the term "uncalibrated." The autocollimator means 32 is utilized only as a transfer device and no information is stored therein. Consequently, there is no inherent error in the applicant's northfinder due to the instability of the optical axis of the autocollimator means. This results in an improved northfinding device which is capable of providing an indication of the true north direction with an accuracy herebefore unattainable.

Referring now to FIGURE 3, reference numeral 40 depicts a generally cup-shaped mounting means which is provided with suitable legs 41. A generally hollow cylindrically shaped casing element 42, closed at both ends, is rotatably mounted within the mounting means 40 by means of bearing 43 and bearing 45. The bearings 43 and 45 define an axis of rotation 47. The bearing elements 43 and 45 allow casing element 42 to rotate about the axis 47 which is adjusted so as to be parallel to the earth's gravity vector (vertical) by suitable adjustment of the legs 41 of the mounting means 40. Means are provided to manually rotate the casing element 42 about the axis 47 which comprise gear teeth 51 machined upon a boss element 50 which is rigidly attached around the periphery of the casing element 42 by suitable means. Boss element 50 also provides a recess for maintaining the inner race of bearing means 43 thereto. The outer race of bearing means 43 is rigidly connected to mounting means 40 by suitable means. A worm gear element 52 is attached to the mounting means 40 by suitable means and cooperates with gear teeth 51 so as to rotate the casing element 42 about the axis 47 when the worm gear element 52 is rotated by a handle means (not shown).

A generally hollow cylindrically shaped gimbal element 55 closed at both ends is pendulously suspended within casing element 42 by means of a suspension wire 56. The connection of suspension wire element 56 to the casing 42 is not illustrated in FIGURE 3 due to space limitations; however, it will be understood that the suspension wire 56 is attached to casing element 42 so that the longitudinal axis of the wire is substantially coaxial with axis 47.

An air-bearing spin motor assembly is generally depicted by reference numeral 60 and is mounted within the gimbal element 55. The spin motor assembly 60 comprises a stator assembly 61 and a rotor assembly 62. Stator assembly 61 comprises a shaft portion which is rigidly attached to gimbal element 55 by suitable means, such as bolts 63 and 64. Stator assembly 61 also includes two motor windings 65 mounted around the periphery of the shaft portion and spaced apart. The stator element also includes a radially extending thrust plate 66 positioned between the motor windings 65. The rotor assembly 62 includes two hysteresis rings 67 and a ceramic rotor element 68 surrounding the stator assembly 61. Two hysteresis rings 67 are mounted upon rotor element 68 and are positioned so as to circumscribe the two motor windings 65.

It should be pointed out that the rotor assembly 62 rotates about the SRA and is supported by a film of air during such rotation so that there is no contact between the rotor assembly 62 and the stator assembly 61. The films of air providing the two radial bearings are indicated by the reference numerals 70. The films of air providing an axial thrust bearing are indicated by the reference numeral 71. In operation of an air bearing spin motor of the type described, the surfaces 75 of the ceramic rotor elements 68 adjacent to the films of air 71 are absolutely perpendicular to and uniquely determine the SRA of the rotor 62. Stated otherwise, it is the surfaces 75 which determine the orientation of the SRA. The surfaces 75 are absolutely perpendicular to the SRA, since any microscopic irregularities in the surface 75 will average out to zero as the rotor assembly 62 rotates about the SRA. An annular exterior surface 72, parallel to surface 75, is provided on the rotor element 68. This surface 72 thus is also absolutely perpendicular to the SRA during rotation of the rotor assembly. The surface 72 is treated with a suitable means so as to provide a reflecting surface 73 which is also absolutely perpendicular to the SRA. Therefore, a line perpendicular to the reflecting surface 73 (e.g. a beam of light reflected therefrom as indicated by lines 75) is parallel to and aligned with the SRA and this gives an indication of the direction of the SRA.

Gimbal element 55 is also provided with a window 74 therein having optically flat and parallel surfaces, so as to provide the passage of light therethrough, without refraction.

Because of the pendulous suspension of gimbal element 55 by suspension wire 56 it is necessary to provide a suitable caging means for caging the gimbal element 55 when the northfinder is not operating. This caging means comprises a cup-shaped contacting member 80 which is positioned within casing element 42 and is in slideable contact therewith and a second similar cup-shaped element 82 which is rigidly attached to casing element 42. When the gimbal 55 is to be caged, the upper portion of contact element 80 as viewed in FIGURE 3 makes contact with gimbal element 55, capturing it between contact element 80 and contact element 82 so as to prevent movement of gimbal element 55. The gimbal element 55 is uncaged by removing contact elements 80 and 82 from contact with gimbal 55 by means of a screw element 81. The rotation of screw element 81 permits contact member 80 to be moved downwardly as viewed in FIGURE 3 thereby removing the gimbal element 55 from contact with elements 80 and 82.

An autocollimator means 85 is also provided and is rigidly attached to bracket element 86 by means of screws 87. The bracket element 86 is in turn rigidly attached to casing element 42 by suitable means. The autocollimator means 85 is attached to casing element 42 such that an optical axis 88 of the autocollimator means is perpendicular to the axis 47. Stated another way, the autocollimator means 85 is positioned so that the optical axis 88 may be positioned perpendicular to the reflecting surface 73 of the spin motor assembly 60 during rotation thereof.

Casing means 42 is also provided with an aperture 90 therein. The autocollimator means 85 is positioned so that the optical axis 88 is approximately coaxial with the axis of aperture 90 so as to permit the passage of light from autocollimator means 85 through aperture 90 and window 74 to reflecting surface 73.

The autocollimator means 85 is further provided with an eyepiece means 91 and a light source 92. One of the lenses of the autocollimator means 85 is illustrated by reference numeral 93.

A readout means or element or mirror 95 is provided and is attached to the casing element 42 and oriented so as to reflect outwardly from the axis 47. The readout mirror 95 has a plane surface thereon and is oriented such that the plane surface is perpendicular to the optical axis 88. A portion of the surface of readout mirror 95 intersects the light transmitted from the autocollimator means 85 to the reflecting surface 73. As illustrated in FIGURE 3, the readout mirror 95 is positioned so as to intercept approximately one half of the light transmitted from the autocollimator means and reflect it back to the eyepiece 91. The readout mirror 95 also extends axially downwardly as viewed in FIGURE 3. An opening which is identified by reference numeral 96, is provided in casing means 42. The function of opening 96 is to allow a line of sight perpendicular to the area of mirror 95 (illustrated by lines 97) to be established from an external device, such as a transit, so as to obtain an indication of the direction of the SRA and consequently an indication of the true north.

*Operation*

In operation, the northfinder device is positioned, for example, upon the surface of the earth and the legs 41 of mounting means 40 are adjusted so that the axis 47 is oriented coaxial with the earth's gravity vector, or in other words, perpendicular to the surface of the earth at that point. The gimbal element 55 is uncaged by rotating screw element 81 in a counterclockwise direction when viewed from the bottom of FIGURE 3. This causes the screw element 81 to withdraw slightly from the casing element 42 and allows the caging contact members 80 and 82 to be withdrawn from contact with the gimbal element 55 thus freeing the gimbal element.

The spin motor is energized so as to rotate the rotor assembly 62 about the SRA. The energization is brought in from the mounting means to the casing means through suitable slip rings (not shown) and from the casing means to the gimbal element by flex leads (not shown). Upon energization of the spin motor, the rotor assembly 62 rotates about the SRA, which is horizontal, since the SRA is perpendicular to the axis 47 which was positioned vertical to the earth's surface.

Since the spin reference axis (SRA) of the air-bearing spin motor is horizontal and the gimbal element 55 is penduously suspended within casing element 42, the SRA is northseeking. That is to say, the interaction of the turntable motion of the earth and the earth's gravitational force causes the SRA to seek the meridian. An undamped system, such as shown, will oscillate about the true north position. With reference to FIGURE 3, the SRA of the spin motor assembly 60 oscillates about the true north direction. Therefore, gimbal element 55 tends to rotate about the axis of the suspension wire 56 (which is coaxial with axis 47) relative to the mounting means 40. As the gimbal element 55 oscillates, an operator maintains the surface of readout mirror element 95 parallel to the surface of reflecting surface 73 by manually turning worm gear element 52 thereby causing casing element 42 to be rotated about axis 47 in time phase with gimbal 55.

The operator determines whether or not the surface of readout mirror element 95 is parallel to the reflecting surface 73 by observing the light in eyepiece 91 of the autocollimator means. A typical image is illustrated in FIGURE 4. The light source 92 in cooperation with the other components, including lens 93, of the autocollimator means 85 projects an image along optical axis 88. A typical image would be a narrow, generally rectangular, beam of light. With reference to FIGURE 3, it will be noted that a first image will be reflected back to the eyepiece 91 by readout mirror 95. A second image will be reflected back to the eyepiece 91 by reflecting surface 73. A second image, which is reflected by surface 73, is identified in FIGURE 4 by reference numeral 100. Reference numeral 101 identifies the first image which is reflected by readout mirror 95. A cross hair in eyepiece 91 is identified by reference numeral 102 and is illustrated aligned with first image 101 in FIGURE 4. The images 100 and 101 are shown slightly offset in FIGURE 4. When the images 100 and 101 are aligned in the eyepiece 91 so that they appear as a single rectangular beam of light, the reflecting surface 73 and the readout mirror 95 are parallel. By construction, the reflecting surface 73 is perpendicular to the SRA, consequently the plane surface of readout mirror is perpendicular to the SRA. The result is that a line perpendicular to the surface of readout mirror 95, for example lines 97, is parallel to and aligned with the SRA and gives an indication of the direction of the SRA.

It should be noted that the function of the autocollimator means 85 in the applicant's unique northfinder device, is merely to transfer the information of the direction of the SRA from the reflecting surface 73 to the readout mirror 95. No information is stored in the autocollimator. Consequently, the applicant eliminates the inherent errors of the prior art devices due to the instability of the optical axis of the autocollimator means.

The SRA oscillates about the true north direction in a generally sinusoidal relationship and the period of oscillation for the particular embodiment illustrated is approximately seven minutes. At the position of maximum deflection from the true north direction (that is, the position where the gimbal element changes its direction of rotation), the gimbal element is instantaneously stopped. At this position, an operator notes the azimuth position of the SRA by suitable azimuth reference means (not shown). This azimuth reference means may take the form of an azimuth reference circle attached to the casing means 42 about the axis 47 and an eyepiece attached to the mounting means 40. One such azimuth reference means referred to as a "Unisec," is manufactured by the W. & L. E. Gurley Company. As the SRA rotates in the opposite direction another reading of the azimuth is taken at the opposite position of maximum deflection. A third azimuth reading is taken when the SRA rotates back in the original direction to the position of maximum deflection. A fourth reading is taken at a point near that of the second reading. The reason for taking four consecutive readings is to negate a biasing effect which would be introduced by the decrement in the oscillation of gimbal element 55.

After the four azimuth readings of the position of maximum deflection of the SRA have been recorded, the true north direction is obtained by determining the midpoint of the azimuth readings. As was pointed out earlier, the SRA oscillates about the true north direction, therefore it follows that the midpoint of the oscillations is the true north direction. The casing 42 is rotated, by turning worm gear 52, to the midpoint of the azimuth readings. In this position, a line perpendicular to the plane surface of readout mirror 95, such as lines 97, provides an indication of the true north direction.

Consequently, it will be understood that an improved gyroscopic northfinder device has been shown which provides a primary (uncalibrated) indication of the true north direction. By utilizing the optical follow-up method herein described the autocollimator means 85 is utilized only as a transfer device. That is to say, the information of the direction of the SRA, or in other words, a line perpendicular to the reflecting surface 73, is transferred from the reflecting surface through the autocollimator means 85 to the readout mirror 95. The indication of true north from the readout mirror 95 may be utilized by some external device, such as a transit, to obtain the desired reference. Consequently, no information is stored within the autocollimator means 85 and there is no requirement that the optical axis of the autocollimator means remain stable.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit or scope of this invention.

What is claimed is:

1. A north-seeking gyroscope comprising: a mounting element; a casing element, said casing element being mounted upon said mounting element for rotation about a first axis perpendicular to the earth's surface; a gimbal element, said gimbal element pendulously suspended within said casing element for rotation about said first axis; an air-bearing spin motor including a rotor element mounted within said gimbal element for rotation about a second axis perpendicular to said first axis, said axis of said rotor element oscillating about the true north direction upon rotation of said rotor element, said oscillation being about said first axis, said rotor element having a reflecting surface perpendicular to said second axis; autocollimator means rigidly attached to said casing means, said autocollimator means having an optical axis perpendicular to said first axis, said autocollimator means projecting an image along said optical axis; a readout mirror rigidly attached to said casing means and positioned so as to reflect a first image back to said autocollimator means, said surface reflecting a second image back to said autocollimator means when said optical axis is perpendicular to said surface; and means for rotating said casing element about said first axis so as to continuously maintain said optical axis perpendicular to said surface, said autocollimator means transferring the information of the direction of said axis of said rotor element from said surface to said readout mirror so as to provide a primary indication of the true north direction.

2. A north-seeking gyroscope comprising: mounting means; casing means mounted upon said mounting means for rotation about a first axis perpendicular to the earth's surface; gimbal means pendulously suspended within said casing means for rotation about said first axis; spin motor means mounted within said gimbal means for rotation about a second axis perpendicular to said first axis, said axis of said spin motor means oscillating about the true north direction when said spin motor means is rotating; autocollimator means attached to said casing means and having an optical axis perpendicular to said first axis, said autocollimator means projecting light along said optical axis; a readout mirror rigidly attached to said casing means and positioned so as to provide a first reflection of the projected light back to said autocollimator means, said spin motor means having a reflecting surface perpendicular to said second axis, said surface providing a second reflection of the projected light back to said autocollimator means when said optical axis is perpendicular to said surface; and means for rotating said casing means about said first axis so as to continuously maintain said optical axis perpendicular to said surface; and said autocollimator means thereby transferring the information of the direction of said axis of said spin motor from said surface to said readout mirror so as to provide an indication of the true north direction.

3. A north-seeking gyroscope comprising: a housing element; a casing element, said casing element being mounted upon said housing element for rotation about a first axis; a gimbal element, said gimbal element pendulously suspended within said casing element for rotation about said first axis; spin motor means including a rotor element mounted within said gimbal element for rotation about a second axis perpendicular to said first axis, said second axis of said rotor element oscillating about the true north direction when said rotor element is rotating, said rotor element having a reflecting surface perpendicular to said second axis; autocollimator means rigidly attached to said casing means, said autocollimator means having an optical axis perpendicular to said first axis, said autocollimator means being adapted to project an image along said optical axis; a readout mirror rigidly attached to said casing means and positioned perpendicular to said optical axis so as to reflect a first image back to said autocollimator means, said surface of said rotor element permitting a second image to be reflected back to said autocollimator means when said surface is perpendicular to said optical axis; and means for rotating said casing element about said first axis so as to continuously maintain said optical axis perpendicular to said surface as said axis of said rotor is oscillating about the true north direction and thereby align said first and said second images, the direction of said second axis of said rotor element thereby being transferred from said surface through said autocollimator to said readout mirror so as to indicate the true north direction.

4. A north-seeking gyroscope comprising: a housing element; a casing element, said casing element being mounted upon said housing element for rotation about a first axis; a gimbal element, said gimbal element pendulously suspended within said casing element; spin motor means including a rotor element mounted within said gimbal element for rotation about a second axis perpendicular to said first axis, said second axis of said rotor element oscillating about the true north direction when said rotor element is rotating, said oscillation being about said first axis, said rotor element having a reflecting surface perpendicular to said second axis; autocollimator means rigidly attached to said casing means, said outocollimator means having an optical axis perpendicular to said first axis, said autocollimator means being adapted to project an image along said optical axis; a readout element rigidly attached to said casing means and positioned perpendicular to said optical axis so as to reflect a first image back to said autocollimator means, said surface of said rotor element oriented so as to reflect a second image back to said autocollimator means when said surface is perpendicular to said optical axis; and means for rotating said casing element about said vertical axis so as to continuously maintain said optical axis perpendicular to said surface and thereby transfer the information of the direction of said axis of said rotor element from said surface through said autocollimator to said readout element so as to indicate the true north direction.

5. An optical follow-up system for a pendulous gyroscope northfinder comprising autocollimator means having an optical axis, said autocollimator means having a light source and projecting an image along said optical axis; spin motor means having a reflecting surface perpendicular to its axis of rotation, said optical axis being adapted to be positioned perpendicular to said surface so as to reflect a first image back to said autocollimator means; and readout means having a reflecting area thereon, said readout means being positioned so that said area is perpendicular to said optical axis and reflects a second image to said autocollimator means, and said collimator means aligning said first and second images and thereby transferring the information of the direction of said axis of rotation from said surface to said readout means and providing an indication of the direction of said axis of rotation.

6. An optical readout system for a pendulous gyroscope northfinder comprising autocollimator means having an optical axis, said autocollimator means being adapted to project an image; spin motor means having a reflecting surface perpendicular to its axis of rotation, said optical axis being adapted to be aligned perpendicular to said surface so as to permit a first image to be reflected from said surface back to said autocollimator means; and a reflecting element having an area thereon, said reflecting element being positioned so that said area is perpendicular to said optical axis so as to permit a second image to be reflected back to said autocollimator means, said autocollimator means utilizing said first and said second images so as to transfer the information of the direction of said axis of rotation from said surface to said reflecting element so as to provide an indication of the direction of said axes of rotation.

7. An optical follow-up system for a pendulous gyroscope northfinder comprising autocollimator means having an optical axis, said autocollimator means projecting an image along said optical axis; spin motor means having a first reflecting surface perpendicular to its axis of rotation, said optical axis being adapted to be aligned perpendicular to said first reflecting surface so as to permit a first image to be reflected back to said autocollimator means; and a second reflecting surface, said second reflecting surface being positioned perpendicular to said optical axis so as to permit a second image to be reflected back to said autocollimator means, and the alignment of said first and said second images within said autocollimator means indicating that said second reflecting surface is parallel to said first reflecting surface, said second reflecting surface thereby providing an indication of the direction of said axis of rotation.

8. An optical follow-up system for a pendulous gyroscope northfinder comprising autocollimator means having an optical axis, said autocollimator means being adapted to project an image along said optical axis; spin motor means having a reflecting surface perpendicular to its axis of rotation, said optical axis being adapted to be aligned perpendicular to said surface so as to reflect a first image back to said autocollimator means; and readout means having a reflecting area thereon, said readout element being positioned so that said area is perpendicular to said optical axis so as to reflect a second image back to said autocollimator means, information of the direction of said axis of rotation of said spin motor thereby being transferred from said surface through said autocollimator means to said readout element so as to provide an indication of the direction of said axis of rotation.

References Cited in the file of this patent

UNITED STATES PATENTS

| 1,707,475 | Henderson | Apr. 2, 1929 |
| 1,998,948 | Wittkuhns et al. | Apr. 23, 1935 |
| 2,948,813 | Osborne | Aug. 9, 1960 |
| 2,968,954 | Mueller | Jan. 24, 1961 |